United States Patent
Keating et al.

(10) Patent No.: US 10,094,431 B2
(45) Date of Patent: Oct. 9, 2018

(54) SEGMENT AND LAMINATED MECHANICAL CLUTCH RACE FOR PERMANENTLY ENGAGED STARTER ONE WAY CLUTCH

(71) Applicant: BORGWARNER INC., Auburn Hills, MI (US)

(72) Inventors: Martin Keating, Plainfield, IL (US); James R. Papania, Bolingbrook, IL (US)

(73) Assignee: BorgWarner Inc., Auburn Hills, MI (US)

( * ) Notice: Subject to any disclaimer, the term of this patent is extended or adjusted under 35 U.S.C. 154(b) by 262 days.

(21) Appl. No.: 15/056,574

(22) Filed: Feb. 29, 2016

(65) Prior Publication Data

US 2017/0248176 A1    Aug. 31, 2017

(51) Int. Cl.
| | |
|---|---|
| F16D 41/06 | (2006.01) |
| B32B 38/04 | (2006.01) |
| F16D 41/12 | (2006.01) |
| B21D 28/06 | (2006.01) |
| B32B 38/00 | (2006.01) |
| B32B 15/01 | (2006.01) |
| B32B 3/26 | (2006.01) |
| B32B 7/12 | (2006.01) |
| B32B 37/12 | (2006.01) |

(Continued)

(52) U.S. Cl.
CPC ............. *F16D 41/06* (2013.01); *B21D 28/06* (2013.01); *B21D 39/037* (2013.01); *B21D 53/84* (2013.01); *B32B 3/26* (2013.01); *B32B 7/12* (2013.01); *B32B 15/01* (2013.01); *B32B 37/12* (2013.01); *B32B 37/18* (2013.01); *B32B 38/0012* (2013.01); *B32B 38/04* (2013.01); *F16D 41/12* (2013.01); *B21D 43/22* (2013.01); *B32B 2038/042* (2013.01); *B32B 2311/00* (2013.01); *B32B 2605/00* (2013.01); *F16D 2041/0665* (2013.01); *F16D 2250/00* (2013.01); *F16D 2250/0069* (2013.01)

(58) Field of Classification Search
CPC ................................ F16D 41/00–41/36; F16D 2250/00–2250/0092; B23B 1/00–2607/02
See application file for complete search history.

(56) References Cited

U.S. PATENT DOCUMENTS

| | | |
|---|---|---|
| 6,333,112 B1 | 12/2001 | Field et al. |
| 6,338,403 B1 | 1/2002 | Costin et al. |

(Continued)

*Primary Examiner* — Richard M Lorence
(74) *Attorney, Agent, or Firm* — Miller, Matthias & Hull LLP

(57) ABSTRACT

A race for a mechanical clutch assembly may be formed from multiple race layers that assembled from pluralities of stamped arcuate segments. First and second race layers may have the same shape when their arcuate segments are assembled are assembled. The arcuate segments of the first race layer may be identical to each other, and the arcuate segments of the second race layer may be identical to each other, but the first layer arcuate segments are not identical to the second layer arcuate segments. Interlocking joints between the first layer arcuate segments are not aligned with interlocking joints between the second layer arcuate segments when the race layers are joined together and aligned for use in the mechanical clutch assembly.

20 Claims, 3 Drawing Sheets

(51) Int. Cl.
*B32B 37/18* (2006.01)
*B21D 39/03* (2006.01)
*B21D 53/84* (2006.01)
*F16D 41/066* (2006.01)
*B21D 43/22* (2006.01)

(56) References Cited

U.S. PATENT DOCUMENTS

| | | |
|---|---|---|
| 6,575,279 B2 | 6/2003 | Quigley |
| 6,745,881 B1 * | 6/2004 | Kremer ............... F16D 41/12 192/107 T |
| 6,757,975 B1 * | 7/2004 | Todd .................. B21D 53/28 192/105 CD |
| 6,848,551 B2 * | 2/2005 | Enomoto ............. F16D 41/066 192/107 T |
| 8,505,705 B2 | 8/2013 | Keating |
| 2008/0314713 A1 | 12/2008 | Vogele et al. |

* cited by examiner

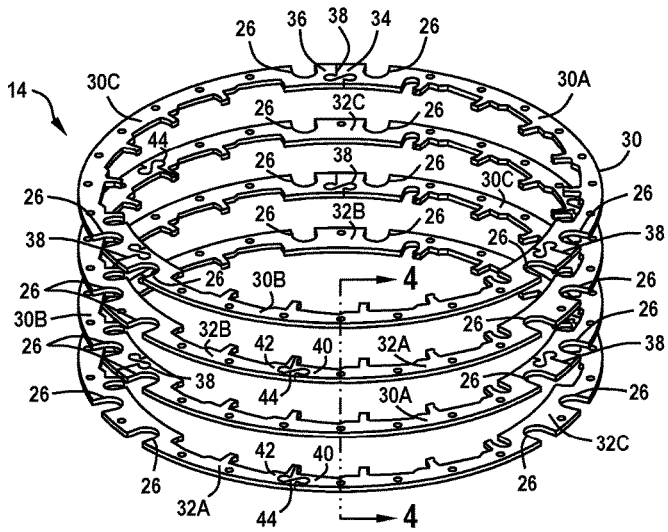
FIG. 3
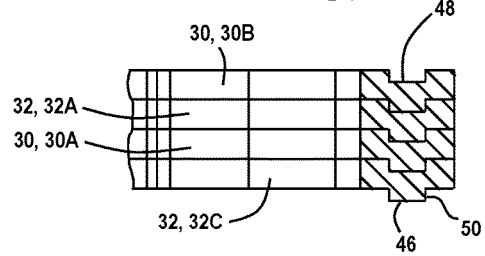
FIG. 4
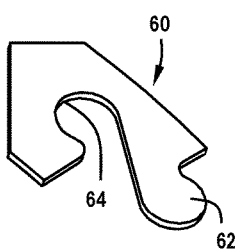
FIG. 5A
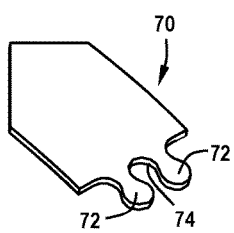
FIG. 5B
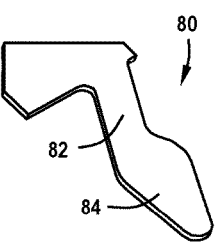
FIG. 5C
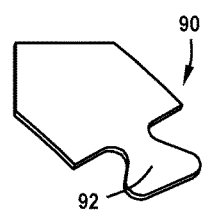
FIG. 5D
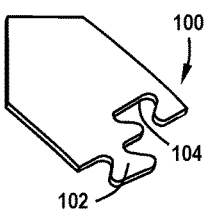
FIG. 5E
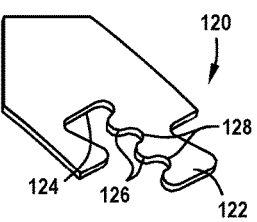
FIG. 5F
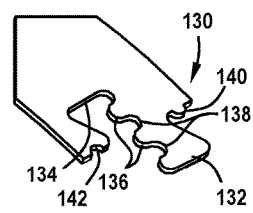
FIG. 5G   FIG. 5H

SEGMENT AND LAMINATED MECHANICAL CLUTCH RACE FOR PERMANENTLY ENGAGED STARTER ONE WAY CLUTCH

TECHNICAL FIELD

The present disclosure relates generally to mechanical clutches (MCs) and multimode clutches (MMCs) and, more particularly, to segmented and laminated outer and inner races formed from stacks of plies or layers to form the clutch race.

BACKGROUND

Mechanical clutches of the type used in automotive transmissions and other applications (ATV/Motorcycle/Truck) to connect two components that rotate relative to each other are constructed using inner and outer races. The inner and outer races provide a number of features such as radial and axial bearing surfaces, clutch engagement surfaces, lubricating channels, axial parts retention, inside and outside torque transfer splines and engagement springs. Mechanical clutches are currently made using varied construction of the inner and outer races. Such varied construction includes wrought-machined steel, powdered metal (forged and conventional) and the like. These types of constructions for the inner and outer races are costly and require secondary processing for the drilling of oil holes and other features. Secondary processing can also include machining or grinding the outer race down to a specified thickness where the primary processing and fabrication processes leave the outer races with extra material that is later removed to achieve the specified thickness within a required tolerance.

SUMMARY OF THE DISCLOSURE

In one aspect of the present disclosure, a race for a mechanical clutch assembly is disclosed. The race may include a first race layer that may include a plurality of first layer arcuate segments each having a first layer segment first end and a first layer segment second end that are configured so that the first layer segment first end of one of the first layer arcuate segments and the first layer segment second end of an adjacent first layer arcuate segment engage to form a first layer interlocking joint to hold the first layer arcuate segments together, and a second race layer that may include a plurality of second layer arcuate segments each having a second layer segment first end and a second layer segment second end that are configured so that the second layer segment first end of one of the second layer arcuate segments and the second layer segment second end of an adjacent second layer arcuate segment engage to form a second layout interlocking joint to hold the second layer arcuate segments together. The first race layer and the second race layer may have the same shape when the first layer arcuate segments and the second layer arcuate segments, respectively, are assembled. The first layer arcuate segments may be identical to each other, and the second layer arcuate segments may be identical to each other, but the first layer arcuate segments may not be identical to the second layer arcuate segments so that the first layer interlocking joints are not aligned with the second layer interlocking joints when the first race layer and the second race layer are joined together and aligned for use in the mechanical clutch assembly.

In another aspect of the present disclosure, a system for fabricating an race of a mechanical clutch assembly is disclosed. The race may be formed from a plurality of first race layers alternated with a plurality of second race layers, the first race layers may have a plurality of first layer arcuate segments connected by first layer interlocking joints and the second race layers may have a plurality of second layer arcuate segments connected by second layer interlocking joints. The system may include a stamping station that may receive a metal sheet and stamping the metal sheet to form a stamped sheet having alternating pluralities of first layer arcuate segments and second layer arcuate segments. The first layer arcuate segments may be identical to each other, the second layer arcuate segments may be identical to each other, but the first layer arcuate segments may not be identical to the second layer arcuate segments. The system may further include a separator station for receiving the stamped sheet and sequentially separating the first layer arcuate segments and the second layer arcuate segments from the stamped sheet, and an indexing and accumulator station for receiving the first layer arcuate segments and the second layer arcuate segments from the separator station, assembling the first layer arcuate segments into the first race layers and the second layer arcuate segments into the second race layers, and alternately stacking the first race layers and the second race layers to form the race.

In a further aspect of the present disclosure, an race for a mechanical clutch assembly is disclosed. The race may include two first race layers each including three first layer arcuate segments each defining an arc of approximately 120° and having a first layer segment first end and a first layer segment second end that are configured so that the first layer segment first end of one of the first layer arcuate segments and the first layer segment second end of an adjacent first layer arcuate segment engage to form a first layer interlocking joint to hold the first layer arcuate segments together. The race may further include two second race layers each including three second layer arcuate segments each defining an arc of approximately 120° and having a second layer segment first end and a second layer segment second end that are configured so that the second layer segment first end of one of the second layer arcuate segments and the second layer segment second end of an adjacent second layer arcuate segment engage to form a second layout interlocking joint to hold the second layer arcuate segments together. The first race layers may be alternated with the second race layers. The first race layers and the second race layers may have the same shape when the first layer arcuate segments and the second layer arcuate segments, respectively, are assembled. The first layer arcuate segments may be identical to each other, the second layer arcuate segments may be identical to each other, and the first layer arcuate segments may not be identical to the second layer arcuate segments so that the first layer interlocking joints are not aligned with the second layer interlocking joints when the first race layers and the second race layers are joined together and aligned for use in the mechanical clutch assembly.

Additional aspects are defined by the claims of this patent.

BRIEF DESCRIPTION OF THE DRAWINGS

FIG. 3 is an exploded perspective view the outer race of the mechanical clutch assembly of FIG. 1 with the first race layers and the second race layers separated;

FIG. 4 is a cross-sectional view taken through line 4-4 of FIG. 3 of the outer race with the first race layers and the second race layers attached to each other;

FIG. 5A is a perspective view of an embodiment of a puzzle joint;

FIG. 5B is a perspective view of an embodiment of a double puzzle joint;

FIG. 5C is a perspective view of an embodiment of a crocodile joint;

FIG. 5D is a perspective view of an embodiment of an anchor joint;

FIG. 5E is a perspective view of an embodiment of a double anchor joint;

FIG. 5F is a perspective view of an alternative embodiment of a double anchor joint;

FIG. 5G is a perspective view of another alternative embodiment of a double anchor joint;

FIG. 5H is a perspective view of a further alternative embodiment of a double anchor joint;

DETAILED DESCRIPTION

Figure 1:
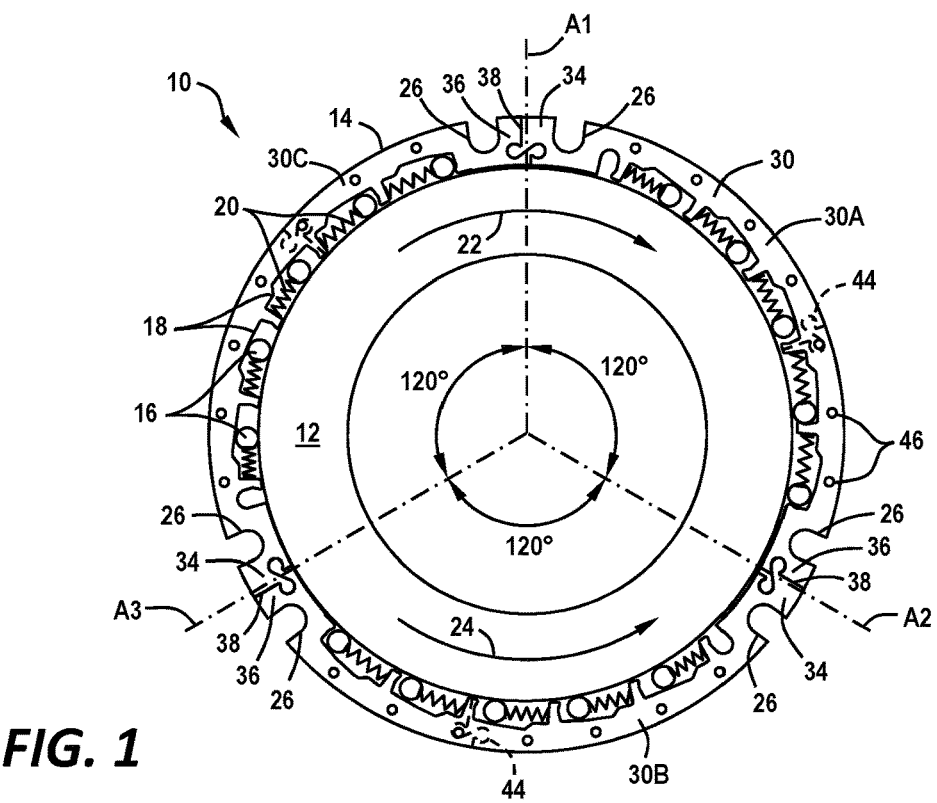
FIG. 1 is a front view of a mechanical clutch assembly having an outer race in accordance with the present disclosure.

FIG. 1 schematically illustrates a mechanical clutch assembly 10 that may include an inner race 12, an outer race 14 and a plurality of individual rollers 16. Each roller 16 may be disposed within a corresponding pocket 18 defined in an inner circumference or periphery of the outer race 14, and may have a spring 20 biasing the roller 16 toward an engaged or locked position. The pockets 18 and the outer periphery of the inner race 12 may be configured so that the rollers 16 are wedged between the walls of the pockets 18 and the outer periphery of the inner race 12 when torques on members connected by the inner race 12 and the outer race 14 tend to rotate the inner race 12 in a first direction 22 relative to the outer race 14 to lock the inner race 12 and the outer race 14 relative to each other. When the torques cause the inner race 12 to rotated in a second direction 24 relative to the outer race 14, the rollers 16 may be free to slide or roll along the outer periphery of the inner race 12 (FIG. 2) against the biasing forces of the springs 20 to unlock the mechanical clutch assembly 10 and allow the inner race 12 to rotate relative to the outer race 14 in the second direction 24. In other embodiments of the mechanical clutch assembly 10, alternative types of one-way locking mechanisms may be used in place of the rollers 16 to alternately lock and unlock the mechanical clutch assembly 10, such pivoting pawls disposed within the pockets 18 and engaging notches in the outer periphery of the inner race 12 to lock the assembly 10 against rotation in one direction. An outer circumference or periphery of the outer race 14 may have a plurality of alignment notches 26 defined therein that may be used for alignment of the outer race 14 during fabrication as will be discussed further below.

In the mechanical clutch assembly 10 in accordance with the present disclosure, the inner race 12 and the outer race 14 may comprise a plurality of layers joined together to form a lamination. Each layer may be formed by stamping operations, each of which stamps a portion of one of the plurality of layers making up the lamination. The number of layers required to obtain a desired thickness for the respective inner race 12 and outer race 14 may depend on the thickness of each layer. The number of layers of stampings may be varied in order to achieve the required thickness. The potential to vary the number of layers in order to obtain the desired thickness for the inner race 12 or the outer race 14 permits the race 12, 14 to be assembled to the precise thickness within the specified range of tolerances without the necessity of grinding the front or back face of the race 12, 14 in order to achieve the desired thickness.

Figure 2:
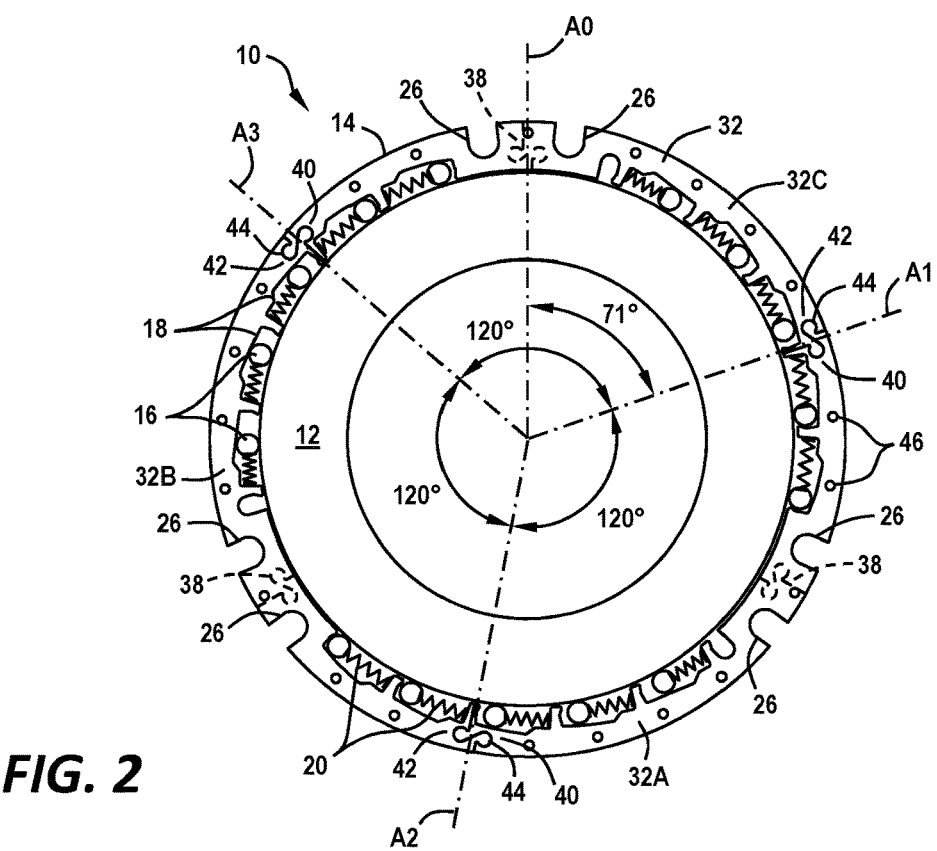
FIG. 2 is a front view of the mechanical clutch assembly of FIG. 1 with an inner race rotated to unlock rollers of the assembly and a first race layer removed to expose a second race layer of the outer race.

Referring to FIGS. 1-4, there is shown one form of the outer race 14 having a plurality of layers or plies (four in the illustration of FIG. 3), including a pair of first race layers 30 (as viewed in FIG. 1 and first and third layers in FIG. 3), and a pair of second race layers 32 (as viewed in FIG. 2 and second and fourth layers in FIG. 3). In the illustrated embodiment, the outer race 14 may have 3-fold symmetry so that each race layer 30, 32 may consist of three segments each defining an arc of approximately 120° that may be referred herein as arcuate segments. Thus, each first race layer 30 (FIGS. 1 and 3) may include three first layer arcuate segments 30A, 30B, 30C. Each first layer arcuate segment 30A, 30B, 30C of each of the first race layers 30 may extend from a first layer segment first end 34 to a first layer segment second end 36. Each combination of the first layer segment first end 34 of one first layer arcuate segment 30A, 30B, 30C and the first layer segment second end 36 of an adjacent first layer arcuate segment 30A, 30B, 30C may be connected by a first layer interlocking joint 38, with the first layer segment first end 34 and the first layer segment second end 36 forming corresponding interconnected portions of the first layer interlocking joint 38. Similarly, each second race layer 32 (FIGS. 2 and 3) may consist of three second layer arcuate segments 32A, 32B, 32C. Each arcuate segment 32A, 32B, 32C may have a second layer segment first end 40 and a second layer segment second end 42 configured so that adjacent ones of the second layer arcuate segments 32A, 32B, 32C are connected by a second layer interlocking joint 44.

From viewing FIG. 3, it can be seen that each arcuate segment 30A, 30B, 30C, 32A, 32B, 32C of one race layer 30, 32 is joined to two arcuate segments 30A, 30B, 30C, 32A, 32B, 32C of each adjacent race layer 30, 32. Thus, as laid out in FIG. 3, the first layer arcuate segment 30A of the first race layer 30 on the top of the outer race 14 may be joined to the second layer arcuate segments 32A, 32C of the second race layer 32 below it. The second layer arcuate segment 32A of that second race layer 32 may be joined to the first layer arcuate segments 30A, 30C of the first race layer 30 below it. Finally, the first layer arcuate segment 30A of that first race layer 30 may be joined to the second layer arcuate segments 32A, 32C of the second race layer 32 at the bottom of the outer race 14.

As can be seen in FIGS. 1 and 2, the first race layer 30 and the second race layer 32 may have the same shape when the first layer arcuate segments 30A, 30B, 30C and the second layer arcuate segments 32A, 32B, 32C, respectively, are assembled. In the assembled outer race 14, the first race layers 30 and the second race layers 32 are joined together and aligned for use in the mechanical clutch assembly 10 with the pockets 18 aligned for receipt of the rollers 16 and the springs 20. Due to the 3-fold symmetry of the outer race 14, the first layer arcuate segments 30A, 30B, 30C are identical to each other, and the second layer arcuate segments 32A, 32B, 32C are identical to each other. However, the first layer arcuate segments 30A, 30B, 30C are not identical to the second layer arcuate segments 32A, 32B, 32C, and consequently are not interchangeable with the first layer arcuate segments 30A, 30B, 30C when assembling the outer race 14.

The outer race 14 is configured to be divisible into three identical arcuate segments of approximately 120° as indicated by axes A1, A2, A3 that are circumferentially spaced apart from each other by 120°. For the first race layer 30 in FIG. 1, the axes A1, A2, A3 are aligned approximately coincident with first layer interlocking joints 38 to indicate the divisions between the first layer arcuate segments 30A, 30B, 30C that have identical shapes. The alignment notches 26 defined in the outer circumferential surface of the first race layer 30 are disposed proximate the first layer interlocking joints 38. Consequently, a first alignment notch 26 of each first layer arcuate segment 30A, 30B, 30C may be disposed proximate the first layer segment first end 34, and a second alignment notch 26 may be disposed proximate the first layer segment second end 36 so that each first layer interlocking joint 38 has a first alignment notch 26 and a second alignment notch 26 disposed proximate thereto.

For the second race layer 32 in FIG. 2, the axes A1, A2, A3 are rotated approximately 71° from a reference axes A0 to approximately coincide with the second layer interlocking joints 44 to indicate the divisions between the second layer arcuate segments 32A, 32B, 32C that are identical to each other due to the 3-fold symmetry of the outer race 14, but are not identical to the first layer arcuate segments 30A, 30B, 30C. The position of the axes A1, A2, A3 places the second layer interlocking joints 44 between adjacent pockets 18 of the outer race 14. A rotation of approximately 54° from the reference axis A0 would place the second layer interlocking joints 44 between different adjacent pockets 18, but the resulting second layer arcuate segments 32A, 32B, 32C would have identical shapes as is the case for any other degree of rotation of the axes A1, A2, A3 from the reference axis A0.

Because, the alignment notches 26 defined in the outer circumferential surface of the second race layer 32 will be aligned with the alignment notches 26 of the first race layer 30 when the outer race 14 is assembled, the alignment notches 26 of the second race layer 32 are disposed remotely from the second layer segment first ends 40, the second layer segment second ends 42, and the second layer interlocking joints 44. As indicated by the hidden lines for the first layer interlocking joints 38 (FIG. 2) and the second layer interlocking joints 44 (FIG. 1), the first layer interlocking joints 38 are not aligned with the second layer interlocking joints 44 when the first race layer 30 and the second race layer 32 are joined together with the pockets 18 and the alignment notches 26 aligned. With the first layer interlocking joints 38 being out of alignment with the second layer interlocking joints 44, the outer race 14 is better able to withstand thrust loads than if the interlocking joints 38, 44 were aligned and more susceptible to separation under such loading conditions.

In stamping the arcuate segments 30A, 30B, 30C, 32A, 32B, 32C, each arcuate segment 30A, 30B, 30C, 32A, 32B, 32C may have stamped therein a plurality of semi-perforations 46. Each semi-perforation 46 is a stamped portion which extends only part way through the thickness of the segment. In the embodiment of FIGS. 1-3, each arcuate segment 30A, 30B, 30C, 32A, 32B, 32C may have seven semi-perforations 46 generally circumferentially spaced about the respective arcuate segment 30A, 30B, 30C, 32A, 32B, 32C. FIG. 4 shows a fragmentary section of the four race layers 30, 32 of the outer race 14 joined together. Namely, the first layer arcuate segment 30B of the first race layer 30 at the top of the outer race 14 may be joined to the second layer arcuate segment 32A of the adjacent second race layer 32, the second layer arcuate segment 32A may be joined to the first layer arcuate segment 30A of the first race layer 30 below, and the first layer arcuate segment 30A may be joined to the second layer arcuate segment 32C of the second race layer 32 at the bottom of the outer race 14. FIG. 4 is taken through line 4-4 of FIG. 3, but shows the race layers 30, 32 of the outer race 14 joined together.

As may be seen in FIG. 4, each semi-perforation 46 may be stamped only approximately one-half way through the thickness of the metal sheet forming the arcuate segments 30A, 30B, 30C, 32A, 32B, 32C. Each semi-perforation 46 accordingly has an indentation 48 on one surface and a protrusion 50 on an opposing surface. Preferably, the semi-perforations 46 are formed with a circular cross-sectional configuration such that the diameter of the indentations 48 and the diameter of the protrusions 50 are substantially the same but with dimensions such that the protrusions 50 of one race layer 30, 32 may be received in the indentations 48 of an adjacent race layer 30, 32. As shown in FIG. 4, the semi-perforations 46 of the first layer arcuate segment 30B overlay corresponding semi-perforations 46 of the second layer arcuate segment 32A and, upon assembly, the protrusions 50 of the first layer arcuate segment 30B snuggly fits within the indentations 48 of the second layer arcuate segment 32A. Similar relationships exist between the arcuate segments 32A and 30A, and the arcuate segments 30A and 32C, and thereby ensure that the pockets 18 are substantially aligned through the thickness of the outer race 14. If desired, an additional first race layer 30 having perforations stamped completely through could be provided at the bottom of the outer race 14 in order to receive the protrusion 50 of the bottom second race layer 32 while presenting a bottom surface of the outer race 14 that may be flat.

While the embodiment of the outer race 14 illustrated in FIGS. 1-3 is configured with 3-fold symmetry to be divided into three first layer arcuate segments 30A, 30B, 30C, three second layer arcuate segments 32A, 32B, 32C, or other configurations of three identical arcuate segments defining arcs of approximately 120°, other configurations are contemplated where the outer race 14 may be divided into greater or fewer than three identical arcuate segments. For example, the outer race 14 can be configured with 2-fold symmetry allowing the outer race 14 to be divided into only two identical arcuate segments defining arcs of approximately 180° each. In further alternative embodiments, the outer race 14 may be configured to be divided into more than three arcuate segments that are identical. An outer race with 4-fold symmetry could be divided into four identical arcuate segments defining 90° arcs, an outer race with 5-fold symmetry could be divided into five identical arcuate segments defining 72° arcs, an outer race with 6-fold symmetry could be divided into six identical arcuate segments defining 60° arcs, and so on.

If desired, the outer race 14 may be configured so that the first race layer 30 and the second race layer 32 are divided into different numbers of arcuate segments. In one example, the outer race 14 may be configured with 12-fold symmetry so that dividing a layer into 30°, 60°, 90° or 120° arcs would result in twelve, six, four or three identical arcuate segments, respectively. The first race layer 30 could be divided into three arcuate segments and the second race layer 32 could be divided into four arcuate segments, with the arcuate segments being positioned so that the interlocking joints 38, 44 are not aligned when the assembled race layers 30, 32 are aligned. The flexibility in designing the symmetry of the outer race 14 and in dividing the outer race 14 and the race layers 30, 32 into arcuate segments may facilitate optimization of the design of the outer race 14 with respect to manufacturing cost, amount of scrap material, strength and the like.

Flexibility in the design of the outer race 14 may also be provided in alternative configurations of the interlocking joints 38, 44 that may be available for use in the race layers 30, 32, such as those shown in FIGS. 5A-5H. FIG. 5A illustrates a puzzle joint 60 of the type illustrated for the outer race 14 in FIGS. 1-3. The puzzle joint 60 may include a male puzzle connector 62 and a female puzzle receptacle 64 on the end of one arcuate segment that will mate with a corresponding connector 62 and receptacle 64 at the end of the adjacent arcuate segment. FIG. 5B provides a double puzzle joint 70 having two male puzzle connectors 72 defining a female puzzle receptacle 74 there between that will mate with an end of the adjacent arcuate segment having two female receptacles. FIG. 5C illustrates a crocodile joint 80 having an extending neck 82 and head 84 that will be received by a complimentary shaped female receptacle.

FIG. 5D is a first embodiment of an anchor joint 90 having a male connector 92 with a generally trapezoidal shape that will be received in a corresponding trapezoidal shaped female receptacle. FIG. 5E is a double anchor joint 100 wherein each side of the joint 100 may have a male trapezoidal connector 102 and a female trapezoidal receptacle 104. FIG. 5F is a modified double anchor joint 110 where a male trapezoidal connector 112 and a female trapezoidal receptacle 114 are supplemented by a protrusion 116 and a recess 118 along radial end surfaces of the arcuate segment that will mate with corresponding structures on the adjacent arcuate segment that may provide additional support against radial loads acting on the outer race 14. FIG. 5G illustrates a further modified double anchor joint 120 wherein a transitional wall between a male trapezoidal connector 122 and a female trapezoidal receptacle 124 may have a series of peaks 126 and valleys 128 that may mesh with peaks 126 and valleys 128 of the adjacent arcuate segment to increase the strength of the double anchor joint 120 against hoop stresses. A modified double anchor joint 130 as shown in FIG. 5H may be similar to the double anchor joint 120 and have a male connector 132, a female receptacle 134, peaks 136 and valleys 138. The double anchor joint 130 may further include a protrusion 140 and a recess 142 that may be similar to the protrusion 116 and recess 118 of the joint 110 of FIG. 5F.

As with the variations in the configuration of the outer race 14 and the number of arcuate segments into which the race layers 30, 32 may be divided, the illustrated joints 60, 70, 80, 90, 100, 110, 120, 130 may provide flexibility in the design of the outer race 14. An important design criteria for the interlocking joints 38, 44 is their strength against centrifugal forces that are generated when the outer race 14 rotates. The centrifugal forces that must be withstood by the interlocking joints 38, 44 may be determined based on a maximum revolutions per minute (RPMs) anticipated during operation plus a safety factor. In general, simpler interlocking joint designs are weaker than more complex joint design. At the same time, the more complex the interlocking joint design, the more expensive the interlocking joint is to manufacture due at least in part to the cost of tooling required to produce the connecting portions of the interlocking joint. These rules are not absolute, but the strengths and costs of the joints 60, 70, 80, 90, 100, 110, 120, 130 and other interlocking joints will vary and are factored into the design of the outer race 14. Consequently, the particular joint design or designs selected for use in the outer race 14 should exceed the minimum required strength and could be as cost effective as possible of the remaining alternative interlocking joint configurations.

INDUSTRIAL APPLICABILITY

Figure 6:
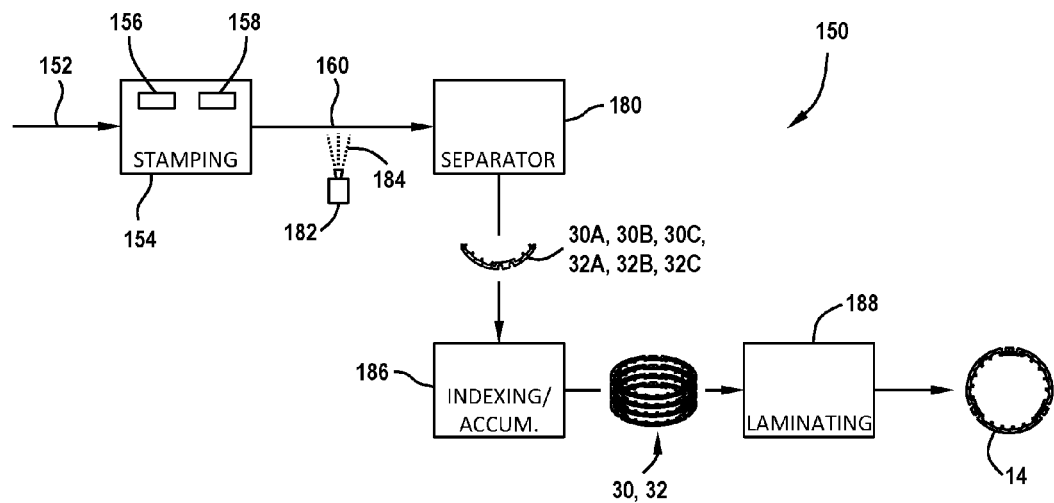
FIG. 6 is a schematic illustration of an outer race fabrication apparatus and process for assembling the outer race of FIGS. 1-3.

FIG. 6 illustrates an exemplary apparatus and process 150 for fabricating the outer race 14 as illustrated and described above in connection with FIGS. 1-4. The process 150 may start with a sheet 152 of an appropriate metal such as steel being fed into a stamping station 154. At the stamping station 154, portions of the metal sheet 152 will be stamped out to form first layer arcuate segments 30A, 30B, 30C and the second layer arcuate segments 32A, 32B, 32C that will later be assembled to form the first race layers 30 and the second race layers 32, respectively. Because the first layer arcuate segments 30A, 30B, 30C are different than the second layer arcuate segments 32A, 32B, 32C, the stamping station 154 may be equipped with a first die 156 for stamping out the first layer arcuate segments 30A, 30B, 30C and a second die for stamping out the second layer arcuate segments 32A, 32B, 32C. The stamping station 154 may be configured and programmed so that the first die 156 and the second die 158 move into and out of a stamping area of the stamping station 154 at the appropriate times to strike the metal sheet 152 and form the corresponding arcuate segments. As the metal sheet 152 is stamped and advanced through stamping station 154, a stamped sheet 160 may exit the stamping station 154 and advance for further processing by the apparatus 150.

Figure 7:
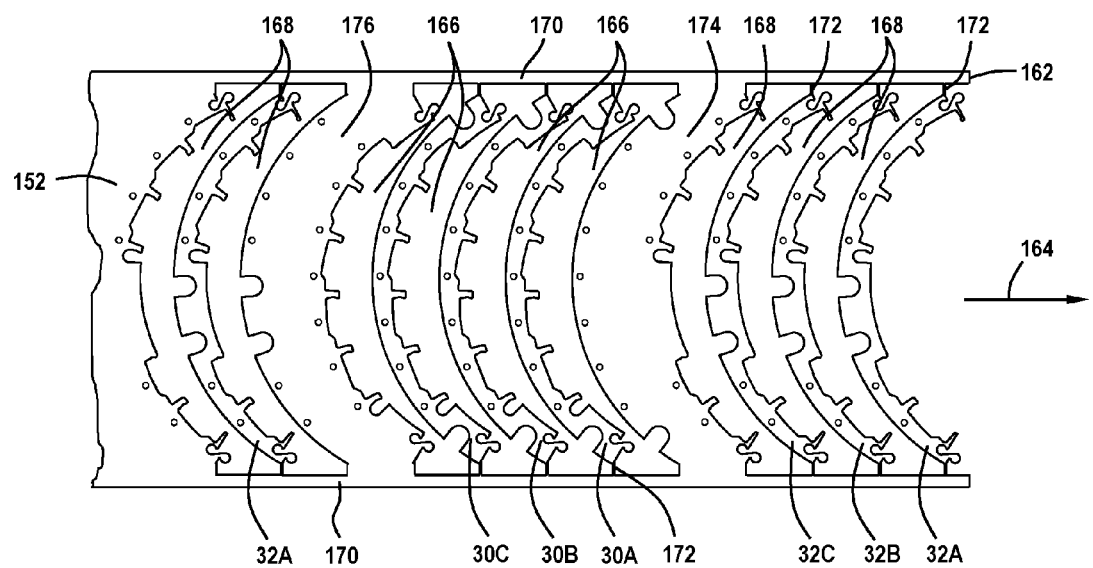
FIG. 7 is a top view of a stamped sheet produced during the process of FIG. 6 and having a plurality of arcuate segments of outer race layers stamped therein.

A portion of the metal sheet 152 that has been converted to the stamped sheet 160 is illustrated in FIG. 7. A leading edge 162 of the stamped sheet 160 may advance in a feed direction 164 through the process 150. Due to the configuration of the outer race 14 as shown in FIG. 3 with the bottom layer being a second race layer 32, the stamped sheet 160 has alternating sections of second layer arcuate segments 32A, 32B, 32C and first layer arcuate segments 30A, 30B, 30C. The shapes of the first die 156 and the second die 158 are apparent from the spaces 166, 168 between the first layer arcuate segments 30A, 30B, 30C and the second layer arcuate segments 32A, 32B, 32C, respectively, where the punches of the dies 156, 158 will define the outer periphery of one arcuate segment and the inner periphery of the adjacent arcuate segment.

Once the leading edge 162 was advanced to the stamping location of the stamping station 154 and with the second die 158 in position to stamp the metal sheet 152, the second die 158 will stamp the inner periphery of the second layer arcuate segment 32A at the leading edge 162. The metal sheet 152 is then successively advanced so that the second die 158 can make three more punches to completely form the second layer arcuate segments 32A, 32B, 32C with the spaces 168 in between. The second layer arcuate segments 32A, 32B, 32C may remain attached to lateral edge portions 170 of the stamped sheet 160 by tabs 172 that remain after stamping so the second layer arcuate segments 32A, 32B, 32C travel with the stamped sheet 160 for downstream processing. The metal sheet 152 may then be advanced past a first transition section 174 where the metal sheet 152 is not punched. The second die 158 may be moved out of position, and the first die 156 may be moved into position to punch the metal sheet 152 and form the first layer arcuate segments 30A, 30B, 30C in four successive punches and advances of the metal sheet 152. The metal sheet 152 may be advanced past a second transition section 176, the second die 158 may be moved back into position to stamp the metal sheet 152 and form the next series of second layer arcuate segments 32A, 32B, 32C. The alternate stamping of the arcuate segments may continue until the metal sheet 152 is completely fed through the stamping station 154 and stamped, or until a specified number of arcuate segments for the production run are produced.

Returning to FIG. 6, the stamped sheet 160 from the stamping station 154 may be fed downstream to a separator station 180. Prior to arriving at the separator station 180, the stamped sheet 160 may pass an adhesive applicator 182 for application of an adhesive 184 to surfaces of the arcuate segments 30A, 30B, 30C, 32A, 32B, 32C that will be used to laminate the race layers 30, 32 together. The adhesive applicator 182 may be any appropriate device for applying an adhesive to surfaces of the arcuate segments 30A, 30B, 30C, 32A, 32B, 32C. In one embodiment, the adhesive applicator 182 may be a spray applicator spraying droplets of a solid glue such as a phenolic resin onto the bottom surfaces of the top three race layers 30, 32 of FIG. 3. The adhesive may be flood coated on the bottom surfaces in their entirety, or may be pattern coated with droplets of the adhesive 184 applied to strategic areas of the bottom surfaces for bonding the race layers 30, 32 to each other. The adhesive applicator 182 may be controlled so that the bottommost race layer 32 is not coated with the adhesive. The location and configuration of the adhesive applicator 182 are exemplary, and variations within the process 150 are contemplated. For example, the adhesive applicator 182 may be positioned upstream of the stamping station 154 or downstream of the separator station 180. Moreover, alternative application technologies could be implemented, such as dipping the arcuate segments 30A, 30B, 30C, 32A, 32B, 32C in a bath of adhesive to coat the surfaces. Other variations for applying adhesive to the race layers 30, 32 will be apparent to those skilled in the art and are contemplated by the inventors as having use in fabricating outer races 14 in accordance with the present disclosure.

At the separator station 180, the tabs 172 may be severed and the arcuate segments 30A, 30B, 30C, 32A, 32B, 32C separated in sequence from the stamped sheet 160. As the arcuate segments 30A, 30B, 30C, 32A, 32B, 32C are separated, they may be transferred individually to an indexing and accumulation station 186 for assembly into the race layers 30, 32 and stacking to form the outer race 14. The indexing and accumulator station 186 may have a turntable (not shown) having a position controlled by a servo motor (not shown). When the second layer arcuate segment 32A proximate the leading edge 162 is separated from the stamped sheet 160 and transferred to and positioned on the turntable, the servo-motor may actuate to rotate the turntable approximately 120° so that the second end 42 is indexed and positioned to engage the first end 40 of the next second layer arcuate segment 32B and form the second layer interlocking joint 44. Guides (not shown) may engage the alignment notches 26 on the outer periphery of the second layer arcuate segment 32A to ensure that the arcuate segment 32A is correctly positioned on the turntable. When the second layer arcuate segments 32A, 32B are joined, the servo-motor may rotate the turntable another 120° so that the final second layer arcuate segment 32C may be joined to the other second layer arcuate segments 32A, 32B and complete the second race layer 32.

With the bottommost second outer race layer 32 assembled, the indexing and accumulator station 186 may be configured to cause the servo-motor to rotate the turntable to the position required for the first race layer 30 to be aligned with the assembled second race layer 32, and for the first layer interlocking joints 38 to be offset from the second layer interlocking joints 44. In the illustrated embodiment of the outer race 14, the servo-motor may cause the turntable to rotate 71° (or 49° depending on the direction of rotation) to the appropriate position for adding the first layer arcuate segment 30A. With the turntable positioned, the first layer arcuate segment 30A may be placed on top of the second layer arcuate segments 32A, 32C as illustrated in FIG. 3. If necessary, the indexing and accumulator station 186 may be configured to apply a downward force on the first layer arcuate segment 30A to force the protrusions 50 of the first layer arcuate segment 30A into the corresponding indentations 48 of the second layer arcuate segments 32A, 32C. Such force may be applied at other appropriate times, such as after a complete race layer 30, 32 is assembled on top of another race layer 30, 32, or after all the race layers 30, 32 of the outer race 14 are assembled and stacked. The servo-motor may continue to rotate the turntable in 120° increments until the first race layer 32 is assembled, and then rotate the turntable into position for installation of the second layer arcuate segment 32A of the next second race layer 32. The process may continue until all the race layers 30, 32 of the outer race 14 are assembled and stacked.

Once complete, the stacked race layers 30, 32 may be transferred from the indexing and accumulator station 186 to a laminating station 188. At the laminating station 188, the race layers 30, 32 may be bonded together with the adhesive 184 that was applied to the bottom surfaces by the adhesive applicator 182. Heat may be applied to the race layers 30, 32 to cause the adhesive 184 to liquefy and spread on facing surfaces of the race layers 30, 32. When the heat is removed, the adhesive 184 cools and forms a reinforcing bond between the race layers 30, 32 to further stabilize the outer race 14 during use. After the laminating process is complete, the fully assembled outer race 14 may be transferred from the laminating station 188 for further assembly with the inner race 12 to complete the mechanical clutch assembly 10.

The outer race fabrication apparatus and process 150 is exemplary, and alternative apparatus and processes are contemplated for manufacturing the outer race 14. For example, the stations 154, 180, 182, 186, 188 may each be a separate apparatus or piece of equipment interconnected by appropriate material handling equipment to transfer the metal sheet 152, the stamped sheet 160, the arcuate segments 30A, 30B, 30C, 32A, 32B, 32C, the race layers 30, 32 and the outer race 14 there between. Alternatively, the stations 154, 180, 182, 186, 188 may be subsystems within a single piece of equipment, such as a blanking press or other appropriate race fabrication apparatus, having the metal sheet 152 and adhesive 184 as inputs and the outer race 14 the output. Additional combinations of the stations 154, 180, 182, 186, 188 and additional or alternative processing steps are contemplated.

By forming the outer race 14 from a plurality of race layers 30, 32 as illustrated and described herein, the race layers 30, 32 can be stacked to specified thickness. The metal sheet 152 can be fabricated with a thickness that will allow the race layers 30, 32 to be stacked to the specified thickness of the outer race 14 and within a prescribed tolerance. Consequently, the necessity of grinding the outer race 14 down to the specified thickness may be greatly reduced and in many instances eliminate, and thereby reducing the cost of producing the outer race 14.

Assembling the race layers 30, 32 from the individually stamped arcuate segments 30A, 30B, 30C, 32A, 32B, 32C can reduce the amount of waste material produced in the fabrication of the outer races 14. As compared to stamping the race layers 30, 32 as complete annular units, fabricating the arcuate segments 30A, 30B, 30C, 32A, 32B, 32C can result in up to a 60% savings in scrap material as compared to stamping the race layers 30, 32 as full rings.

The outer races 14 in accordance with the present disclosure have particular utility in mechanical clutch assemblies 10 connecting an engine shaft to a transmission proximate a flywheel. The forces and stresses encountered by the outer race 14 in such environments may be greater than in other applications, such as clutches installed in transmissions or differentials. Combinations of the interlocking joints 38, 44, the semi-perforations 46 and the adhesive 184 securing the race layers 30, 32 and the arcuate segments 30A, 30B, 30C, 32A, 32B, 32C together may provide the structural integrity necessary to withstand the forces and stresses encountered in harsh environments.

While the discussion herein generally relates to the structure and fabrication of the outer race 14, those skilled in the art will understand that the inner race 12 may be configured and manufactured in a similar manner. The inner race 12 may be formed from multiple layers that are laminated together so that the inner race 12 has a specified thickness. The layers of the inner race 12 may each be composed of a plurality of arcuate segments connected by interlocking joints, with the joints of adjacent layers being offset when the layers are laminated together. The arcuate segments forming each layer may be identical to each other, but the arcuate segments forming one layer of the inner race 12 may not be identical to the arcuate segments of the adjacent layers.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A race for a mechanical clutch assembly, comprising:
a first race layer comprising a plurality of first layer arcuate segments each having a first layer segment first end and a first layer segment second end that are configured so that the first layer segment first end of one of the plurality of first layer arcuate segments and the first layer segment second end of an adjacent one of the plurality of first layer arcuate segments engage to form a first layer interlocking joint to hold the plurality of first layer arcuate segments together; and
a second race layer comprising a plurality of second layer arcuate segments each having a second layer segment first end and a second layer segment second end that are configured so that the second layer segment first end of one of the plurality of second layer arcuate segments and the second layer segment second end of an adjacent one of the plurality of second layer arcuate segments engage to form a second layer interlocking joint to hold the plurality of second layer arcuate segments together,
wherein the first race layer and the second race layer have the same shape when the plurality of first layer arcuate segments and the plurality of second layer arcuate segments, respectively, are assembled, wherein the plurality of first layer arcuate segments are identical to each other, the plurality of second layer arcuate segments are identical to each other, and the plurality of first layer arcuate segments are not identical to the plurality of second layer arcuate segments so that the first layer interlocking joints are not aligned with the second layer interlocking joints when the first race layer and the second race layer are joined together and aligned for use in the mechanical clutch assembly.

2. The race of claim 1, wherein a plurality of pockets are defined in inner circumferential surfaces of the plurality of first layer arcuate segments and the plurality of second layer arcuate segments, with the plurality of pockets of the plurality of first layer arcuate segments and the plurality of pockets of the plurality of second layer arcuate segments being aligned when the first race layer and the second race layer are joined together and aligned for use in the mechanical clutch assembly.

3. The race of claim 1, wherein a plurality of alignment notches are defined in outer circumferential surfaces of the plurality of first layer arcuate segments and the plurality of second layer arcuate segments, with the plurality of alignment notches of the plurality of first layer arcuate segments and the plurality of alignment notches of the plurality of second layer arcuate segments being aligned when the first race layer and the second race layer are joined together and aligned for use in the mechanical clutch assembly.

4. The race of claim 3, wherein the plurality of alignment notches defined in the outer circumferential surfaces of the plurality of first layer arcuate segments each comprise a first alignment notch disposed proximate the first layer segment first end and a second alignment notch disposed proximate the first layer segment second end so that each first layer interlocking joint has one first alignment notch and one of second alignment notch disposed proximate thereto.

5. The race of claim 4, wherein the plurality of alignment notches defined in the outer circumferential surfaces of the plurality of second layer arcuate segments each comprise two second layer alignment notches disposed remotely from the second layer segment first end and the second layer segment second end so that the two second layer alignment notches are disposed remotely from the second layer interlocking joints.

6. The race of claim 5, wherein the each first alignment notch and each second alignment notch is aligned with corresponding ones of the two second layer alignment notches when the first race layer and the second race layer are joined together and aligned for use in the mechanical clutch assembly.

7. The race of claim 1, wherein the first race layer comprises three first layer arcuate segments, with each first layer arcuate segment defining an arc of approximately 120°.

8. The race of claim 7, wherein the second race layer comprises three second layer arcuate segments, with each second layer arcuate segment defining an arc of approximately 120°.

9. The race of claim 8, wherein the second layer interlocking joints are offset from corresponding first layer interlocking joints by approximately 71° when the first race layer and the second race layer are joined together and aligned for use in the mechanical clutch assembly.

10. The race of claim 1, wherein each first layer arcuate segment and each second layer arcuate segment comprises at least one semi-perforation defining an indentation on one surface of the arcuate segment and a protrusion on an opposite surface of the arcuate segment, and wherein the protrusions of the plurality of first layer arcuate segments are received and engaged by the indentations of the plurality of second layer arcuate segments to align the first race layer and the second race layer.

11. The race of claim 1, comprising two first race layers and two second race layers, with the two first race layers being alternated with the two second race layers and the two first race layers being joined to the two second race layers and aligned for use in the mechanical clutch assembly.

12. A system for fabricating an race of a mechanical clutch assembly, wherein the race is formed from a plurality of first race layers alternated with a plurality of second race layers, the plurality of first race layers having a plurality of first layer arcuate segments connected by first layer interlocking joints and the plurality of second race layers having a plurality of second layer arcuate segments connected by second layer interlocking joints, the system comprising:
a stamping station receiving a metal sheet and stamping the metal sheet to form a stamped sheet having alternating pluralities of first layer arcuate segments and second layer arcuate segments, wherein the plurality of first layer arcuate segments are identical to each other, the plurality of second layer arcuate segments are identical to each other, and the plurality of first layer arcuate segments are not identical to the plurality of second layer arcuate segments;
a separator station for receiving the stamped sheet and sequentially separating the plurality of first layer arcuate segments and the plurality of second layer arcuate segments from the stamped sheet; and
an indexing and accumulator station for receiving the plurality of first layer arcuate segments and the plurality of second layer arcuate segments from the separator station, assembling the plurality of first layer arcuate segments into the plurality of first race layers and the plurality of second layer arcuate segments into the plurality of second race layers, and alternately stacking the plurality of first race layers and the plurality of second race layers to form the race.

13. The system of claim 12, comprising:
an adhesive applicator for applying an adhesive to surfaces of the plurality of first layer arcuate segments and the second layer arcuate segments; and
a laminating station receiving a stack first race layers and second race layers from the indexing and accumulator station and applying heat to melt the adhesive and form bonds between adjacent first race layers and second race layers.

14. The system of claim 13, wherein the stamping station, the adhesive applicator, the separator station, the indexing and accumulator station and the laminating station are subsystems within a single piece of equipment.

15. The system of claim 13, wherein the stamping station comprises:
a first die for stamping the plurality of first layer arcuate segments from the metal sheet; and
a second die for stamping the plurality of second layer arcuate segments from the metal sheet.

16. The system of claim 13, wherein the indexing and accumulator station, after a first race layer is assembled, rotates a stack of first race layers and second race layers to a position where the second layer interlocking joints of a next second race layer are not aligned with the first layer interlocking joints of a previous first race layer.

17. An race for a mechanical clutch assembly, comprising:
two first race layers each comprising three first layer arcuate segments each defining an arc of approximately 120° and having a first layer segment first end and a first layer segment second end that are configured so that the first layer segment first end of one of the three first layer arcuate segments and the first layer segment second end of an adjacent one of the three first layer arcuate segments engage to form a first layer interlocking joint to hold the three first layer arcuate segments together; and
two second race layers each comprising three second layer arcuate segments each defining an arc of approximately 120° and having a second layer segment first end and a second layer segment second end that are configured so that the second layer segment first end of one of the three second layer arcuate segments and the second layer segment second end of an adjacent one of the three second layer arcuate segments engage to form a second layout interlocking joint to hold the three second layer arcuate segments together,
wherein the two first race layers are alternated with the two second race layers, wherein the two first race layers and the two second race layers have the same shape when the three first layer arcuate segments and the three second layer arcuate segments, respectively, are assembled, wherein the three first layer arcuate segments are identical to each other, the three second layer arcuate segments are identical to each other, and the three first layer arcuate segments are not identical to the three second layer arcuate segments so that the first layer interlocking joints are not aligned with the second layer interlocking joints when the two first race layers and the two second race layers are joined together and aligned for use in the mechanical clutch assembly.

18. The race of claim 17, wherein a plurality of alignment notches are defined in outer circumferential surfaces of the three first layer arcuate segments and the three second layer arcuate segments, with the plurality of alignment notches of the three first layer arcuate segments and the plurality of alignment notches of the three second layer arcuate segments being aligned when the two first race layers and the two second race layers are joined together and aligned for use in the mechanical clutch assembly.

19. The race of claim 17, wherein the second layer interlocking joints are offset from corresponding first layer interlocking joints by approximately 71° when the two first race layers and the two second race layers are joined together and aligned for use in the mechanical clutch assembly.

20. The race of claim 17, wherein each of the three first layer arcuate segments and each of the three second layer arcuate segments comprises at least one semi-perforation defining an indentation on one surface of the arcuate segment and a protrusion on an opposite surface of the arcuate segment, and wherein the protrusions of the three first layer arcuate segments are received and engaged by the indentations of the three second layer arcuate segments to align the two first race layers and the two second race layers.

* * * * *